(12) United States Patent
Schutt

(10) Patent No.: US 6,432,191 B2
(45) Date of Patent: Aug. 13, 2002

(54) SILANE-BASED, COATING COMPOSITIONS, COATED ARTICLES OBTAINED THEREFROM AND METHODS OF USING SAME

(76) Inventor: John B. Schutt, 2403 Peachstone Ct., Silver Spring, MD (US) 20905

( * ) Notice: Subject to any disclaimer, the term of this patent is extended or adjusted under 35 U.S.C. 154(b) by 0 days.

(21) Appl. No.: 09/778,921

(22) Filed: Feb. 8, 2001

Related U.S. Application Data

(60) Provisional application No. 60/236,158, filed on Sep. 29, 2000, provisional application No. 60/185,354, filed on Feb. 28, 2000, and provisional application No. 60/185,367, filed on Feb. 28, 2000.

(51) Int. Cl.[7] ............................................. C09D 183/00
(52) U.S. Cl. ......................... 106/287.13; 106/287.11; 106/287.14; 106/287.15
(58) Field of Search ....................... 106/287.11, 287.13, 106/287.14, 287.15

(56) References Cited

U.S. PATENT DOCUMENTS

| | | | |
|---|---|---|---|
| 3,576,028 A | | 4/1971 | Fish |
| 4,113,665 A | * | 9/1978 | Law et al. ..................... 528/34 |
| 4,338,375 A | * | 7/1982 | Hashimoto et al. ......... 428/412 |
| 4,466,832 A | | 8/1984 | Yoshimura et al. |
| 4,605,446 A | * | 8/1986 | Isozaki .................. 106/287.12 |
| 4,871,788 A | * | 10/1989 | Plueddemann .............. 523/213 |
| 5,584,921 A | * | 12/1996 | Wagner et al. ........... 106/287.1 |
| 5,882,543 A | | 4/1999 | Peterson et al. |
| 5,929,159 A | * | 7/1999 | Schutt et al. ................ 524/544 |
| 6,000,339 A | * | 12/1999 | Matsuzawa ............ 106/287.14 |
| 6,057,040 A | * | 5/2000 | Hage .......................... 428/447 |

FOREIGN PATENT DOCUMENTS

| | | |
|---|---|---|
| JP | 01-223188 | 9/1989 |
| JP | 10-148488 | 6/1998 |

* cited by examiner

*Primary Examiner*—David Brunsman
(74) *Attorney, Agent, or Firm*—Sherman & Shalloway

(57) ABSTRACT

Silane based coating compositions provide durable, corrosion resistant coatings on metal and non-metal surfaces. A typical composition may include one or a mixture of silanes, such as methyltrimethoxysilane and phenyltrimethoxysilane. The coating compositions may be formulated with either acidic or basic catalysts, the latter being especially suitable for coating steel substrates. Coatings for food and beverage containers, automotive finishes, HVAC surfaces, alkali metal silicates, concrete, and the like, are described. Primer coating compositions which include two or more polyfunctional organosilanes but no monofunctional organosilanes provide strongly adherent corrosion resistant primer coatings for metals and are very adherent to polyurethane, epoxy and other resin topcoats.

26 Claims, No Drawings

US 6,432,191 B2

SILANE-BASED, COATING COMPOSITIONS, COATED ARTICLES OBTAINED THEREFROM AND METHODS OF USING SAME

CROSS-REFERENCE TO RELATED APPLICATIONS

This application claims priority from Provisional Applications Ser. No. 60/185,354 and Ser. No. 60/185,367, both filed Feb. 28, 2000, and from Provisional Application 60/236,158, filed Sep. 29, 2000.

BACKGROUND OF THE INVENTION

1. Field of the Invention

The present invention relates to compositions useful for coating various surfaces, including, metals, especially aluminum, steel and galvanized steel, and various metal alloys, such as brass, alkali metal silicate coatings, priming metals, painted finishes, marine finishes, and the like. More particularly, this invention relates to silane-based, coating compositions which are catalyzed with acid and/or base metallic and/or non-metallic compounds and which form strongly adherent, corrosion resistant coatings on a wide range of painted and non-painted surfaces, including metals, plastics, concrete and alkali metal silicates. Coating compositions of this invention provide hard, transparent, durable coatings which do not suffer noticeable degradation in gloss nor concurrent yellowing over long periods of time under exposure to corrosive, e.g., acidic or alkaline conditions.

2. Discussion of the Prior Art

It is well known to catalyze silanes with acids. However, acid catalyzed aqueous silane coating compositions are not considered useful for coating steel; the acid conditions, e.g., pH below 7, promote corrosion of the steel substrate.

U.S. Pat. Nos. 3,944,702, 3,976,497, 3,986,997 and 4,027,073 describe coating compositions, which are acid dispersions of colloidal silica and hydroxylated silsequioxane in an alcohol-water medium.

U.S. Pat. No. 4,113,665 discloses chemically resistant ambient curable coatings based on a binder of which the major portion is prepared by reacting, in an acidic solution, trialkoxysilanes (e.g., methyltriethoxysilane) with aliphatic polyols, silicones or both. Barium fillers, such as barium metaborate, may be added to provide resistance to sulfur dioxide. Zinc oxide or metallic zinc may be included for further corrosion resistance. The compositions may be applied to, e.g., steel petroleum tanks, by spraying, concrete, vitreous surfaces.

U.S. Pat. No. 4,413,086 describes water reducible coating compositions containing organosilanepolyol which is a reaction product between certain hydrophilic organic polycarbinols and organosilicon material, e.g., organosilane, curing agent (e.g., aminoplast resin), organic solvent (optional), essentially unreacted polyol (optional), essentially unreacted hydrolyzed and condensed organosilane (optional), water (optional) and pigment (optional).

U.S. Pat. No. 4,648,904 describes an aqueous emulsion of (a) hydrolyzable silane, inclusive of methyltrimethoxysilane, (b) surfactant (e.g., Table I, col. 4) and (c) water. The coatings may be used for rendering masonry water repellant.

U.S. Pat. No. 5,275,645 is purported to provide an improvement to the acid-catalyzed organosilane coating compositions of the above-mentioned U.S. Pat. No. 4,113,665. According to this patent a protective coating is obtained at ambient temperature from a coating composition containing organosilanes having an Si—O bond, using an amine catalyst and an organometallic catalyst.

U.S. Pat. No. 5,879,437 describes a coating composition containing a tetraalkyl silicate or monomeric or oligomeric hydrolysis product thereof, present in a proportion of 40–90% by weight based on the non-volatile content of the composition and a hydrous oxide sol (Type A or Type B), in an amount such that the oxide constitutes 10–60% by weight of the non-volatiles. According to the patentees, this coating composition is suitable for the pretreatment of solid surfaces such as metals generally, including steel, titanium, copper, zinc and, particularly aluminum, to improve adhesion properties of the pretreated surface to subsequently applied coatings, such as paint, varnish, lacquer; or of adhesive, either in the presence or absence of a lubricant.

U.S. Pat. No. 5,882,543 describes methods and compositions for dehydrating, passivating and coating HVAC and refrigeration systems. The compositions include an organometalloid and/or organometallic compound, which reacts with water in the system. The sealing function of these compositions is apparently obtained by introducing the composition to the fluid enclosure and upon exiting from an opening, the composition (i.e., organometallic) reacts with atmospheric moisture to seal the opening.

U.S. Pat. No. 5,939,197 describes sol-gel coated metals, especially titanium and aluminum alloys. The sol-gel coating provides an interface for improving adhesion, through a hybrid organometallic coupling agent at the metal surface, between the metal and an organic matrix resin or adhesive. The sol is preferably a dilute solution of a stabilized alkoxyzirconium organometallic salt, such as tetra-i-propoxyzirconium, and an organosilane coupling agent, such as 3-glycidyloxypropyltrimethoxysilane, with an acetic acid catalyst.

U.S. Pat. No. 5,954,869 discloses an antimicrobial coating from water-stabilized organosilanes obtained by mixing an organosilane having one or more hydrolyzable groups, with a polyol containing at least two hydroxyl groups. This patent includes a broad disclosure of potential applications and end uses, e.g., column 4, lines 35–53; columns 23–25.

U.S. Pat. No. 5,959,014 relates to organosilane coatings purported to have extended shelf life. Organosilane of formula $R_nSiX_{4-n}$ (n=0–3; R=non-hydrolyzable group; X=hydrolyzable group) is reacted with a polyol containing at least three hydroxyl groups, wherein at least any two of the at least three hydroxyl groups are separated by at least three intervening atoms.

U.S. Pat. No. 6,057,040 relates to novel bis-aminosilanes and coating compositions containing the bis-aminosilanes.

In my recently issued U.S. Pat. No. 5,929,129, there are described corrosion resistant coatings provided by aqueous-alcoholic dispersions of the partial condensate of monomethyl silanol (obtained by hydrolysis of monomethyl alkoxysilane) alone or in admixture with minor amounts of other silanol, e.g., gamma-glycidyloxy silanol, wherein the reaction is catalyzed by divalent metal ions, e.g., $Ca^{+2}$, typically from alkaline earth metal oxides. When these coating are applied to, e.g., boat hulls, such as aluminum hulls, they are highly effective in preventing corrosion from salt water for extended periods.

The coating compositions of this earlier patent, have also been found to be very highly effective in providing strongly adherent, corrosion resistant coatings on a variety of other substrates and products, including, especially, air conditioning and other HVAC systems (see, e.g., Provisional Application 60/181061, filed Feb. 8, 2000, in the names of Anthony Gedeon, et al.).

In my Provisional Application, Ser. No. 60/185,354, filed Feb. 28, 2000, silane-based, aqueous coating compositions are described which are especially adapted for coating or overcoating refurbished painted finishes, especially as a gel-coat restorative for fiberglass-reinforced epoxy and polyester resins, particularly, for boat hulls and other marine finishes. According to this Provisional application, an acidic aqueous silane based coating composition is described which is obtained by admixing (A) at least one silane of the formula (1)

$$R^1Si(OR^2)_3 \tag{1}$$

wherein
R$^1$ is a lower alkyl group, a phenyl group or an N-(2-aminoethyl)-3-aminopropyl group, and
R$^2$ is a lower alkyl group;
(B) acid component selected from water-soluble organic acids, H$_3$BO$_3$ and H$_3$PO$_3$; and
(C) water.

Other ingredients which can be used in these compositions include silicates, mono-lower alkyl ethers of ethylene glycol, lower alkanol, ultraviolet light absorbers, colloidal aluminum hydroxides and metal alcoholates.

In my provisional application Ser. No. 60/185,367, filed Feb. 28, 2000, I described non-aqueous coating compositions containing, for example, (A) silanes represented by formula (1):

$$R^1{}_nSi(OR^2)_{4-n} \tag{I}$$

where R$^1$ is a lower alkyl group, phenyl group, 3,3,3-trifluoropropyl group, γ-glycidyloxypropyl, γ-methacryloxypropyl group, N-(2-aminoethyl)-3-aminopropyl group or aminopropyl group,
R$^2$ is a lower alkyl group; and
n is a number of 1 or 2;
(B) vinyltriacetoxysilane and/or colloidal aluminum hydroxide and/or at least one metal alcoholate of formula (2):

$$M(OR^3)_m \tag{2}$$

where M is a metal of valence m, R$^3$ is a lower alkyl group; and n is a number of 2 to 4. In other embodiments, the compositions may further include one or more of (C) ethylortho-silicate, ethylpolysilicate or colloidal silica dispersed in lower alkanol; (D) boric acid, optionally dissolved in lower alkanol; (E) γ-glycidyloxypropyltrimethoxysilane; (F) finely divided solid lubricant.

In addition to the immediately above described compositions, which form part of the present invention, there is still a need to provide corrosion resistant coatings which do not require acidic pH's to catalyze the polymerization of silanols to form polysiloxane coatings and which may be applied to steel or other acid degradable surfaces.

There is also a need to provide coating compositions with improved pot life, namely, slow polymerization rates.

There is also a need to provide silane based aqueous coating compositions which are effective to overcoat silicate coatings.

It would also be advantageous to provide silane based aqueous coating compositions which do not include or require surfactants or emulsifiers.

More generally, there is still a need in the coating art for coating compositions which are easy to apply to various metallic or non-metallic substrates and which provide improvements in durability, including adhesion to the substrate, corrosion resistance to acids, alkalis and solvents, and other improved properties, such as transparency, freedom from gellation, storage stability, and the like.

The foregoing and other objects of this invention are described in further detail below.

SUMMARY OF THE INVENTION

Accordingly, this invention provides compositions effective for coating a wide range of metallic and/or non-metallic surfaces, including steel, galvanized steel, brass, aluminum, alkali metal silicates, glass, fiberglass, painted surfaces and the like.

In accordance with one embodiment hereof, an aqueous coating composition is formed by admixing the following ingredients (A), one or both of (B) and/or (C), and (D):

(A) at least one silane of the formula (1)

$$R^1Si(OR^2)_3 \tag{1}$$

wherein
R$^2$ is a lower alkyl group, a phenyl group or a functional group, including at least one of vinyl, acrylic, amino, mercapto, or vinyl chloride functional group; and
R$^2$ is a lower alkyl group;
(B) base component;
(C) acid component selected from the group consisting of alkanoic acid having from about 1 to about 5 carbon atoms, H$_3$BO$_3$ and H$_3$PO$_3$; and
(D) water.

The composition may further comprise (E) epoxy silane. Especially when component (C) is present, the composition may also further comprise an hydroxide or carbonate of magnesium, calcium or zinc. When component (B) is present, the base component may be aminosilane, such as, for example, 3-(2-aminoethylamino)propyltrimethoxysilane or 3-aminopropyltrimethoxysilane. The composition with components (B) and/or (C) may further comprise one or more of, for example, (E) epoxysilane; (F) alkali metal silicate component, which may be hydrolyzed; (G) mono-lower alkyl ether of ethylene glycol; (H) lower alkanol; (I) ultra-violet light absorber; (J) (i) colloidal aluminum hydroxide or (J)(ii) metal alcoholate of formula (2)

$$M(OR^3)_m \tag{2}$$

where M represents a metal of valence m, each R$^3$ independently represents lower alkyl; and m is an integer of 3 or 4 or both (J)(i) and (J)(ii); (K) a color forming silane hydrolysis catalyst, such as, for example, chromium acetate hydroxide.

In accordance with another embodiment of the invention, there is provided an aqueous coating composition formed by admixing (A) at least one silane of formula (1) given above; (D) water; (J) (i) colloidal aluminum hydroxide or (ii) metal alcoholate of formula (2) M(OR$^3$)$_m$ wherein M is a metal of valence m, R$^3$ is a lower alkyl group, and m is 3 or 4, or (iii) a mixture of (i) and (ii); and, optionally, a silane hydrolyzing catalyst, effective to inhibit gellation and extend storage life and pot life, such as epoxide silane.

In accordance with still yet another embodiment of the invention, there is provided an aqueous coating composition formed by admixing (A) at least one silane of formula (1) given above; (H) lower alkanol solvent; (D) water; (K) chromium acetate hydroxide or other silane polymerization catalyst which provides coloration to the resulting coating.

Another embodiment provided by the present invention is an aqueous coating composition formed by admixing (A) at least one silane of formula (1) given above; (D) water; (F) alkali metal silicate, optionally pre-hydrolyzed; (H) lower alkanol as solvent; and (J) (i) colloidal aluminum hydroxide or (ii) metal alcoholate of formula (2) given above or (iii) a mixture of (i) and (ii).

In another embodiment of the invention there is provided a non-metallic aqueous coating composition formed by admixing (A) at least one silane of formula (1) given above; (B) a basic amine silane catalyst, such as 3-(2-aminoethylamino)propyltrimethoxy silane or 3-aminopropyltrimethoxy silane; (D) water; (E) epoxide silane; (H) lower alkanol solvent.

The present invention further provides an aqueous coating composition containing mixed valence silane catalysts. According to this embodiment of the invention, an aqueous coating composition is formed by admixing (A) at least one silane of formula (1) given above; (B) at least one compound comprising an hydroxide or carbonate of a divalent metal, such as calcium or magnesium; (C) boric acid or phosphorous acid; (D) water; (E) ethyl polysiloxane; (H) lower alkanol solvent, and (J) a metal alcoholate of formula (2) above, wherein M represents a tetravalent metal, i.e., m=4, such as, for example, tetrabutoxytitanate.

In still yet another aspect of the invention there is provide an aqueous alcoholic coating composition effective for providing clear, hard and strongly adherent corrosion resistant coatings for glass substrates and for providing clear, hard, glossy and slick (slippery or wax-like) adherent corrosion resistant coatings for metal substrates, such as automobiles and other vehicles. According to this aspect of the invention, there is provided a coating composition which is an alcoholic solution containing as the essential and major film-forming components a mixture of silane compounds of the above formula (1) wherein the $R^1$ group in one silane compound is the lower alkyl group and in another silane compound the $R^1$ group is an aryl group, especially, a phenyl group. The composition also includes small amounts of an alcohol soluble activator, such as, tetramethylammonium hydroxide or calcium hydroxide, which functions, on glass, as an abrasive agent and etchant, and a silicate, preferably, partially hydrolyzed silicate, especially a hydrolysis product of tetraethylsilicate. The non-aqueous compositions may additionally include as an optional but preferred ingredient, γ-glycidyloxypropyltrimethoxysilane or other epoxysilane compound.

According to the present invention, the non-aqueous composition as described in the previous paragraph may be applied to a substrate, such as glass window (particularly, the outside surface of the glass window), or to the painted finish of an automobile, by wiping with a brush, sponge, or soft cloth. After allowing the alcohol to evaporate, leaving a whitish or chalky finish, due to the $Ca(OH)_2$ particles deposited on the surface, the coating is polished to provide a highly transparent hard adherent finish. When applied to a painted metal surface, such as an automobile, the coating becomes slick and glossy, providing a highly durable finish, much superior to known wax finishes. For optimum results, it may be and generally is necessary to thoroughly pre-clean the surface to be coated.

The invention also provides the novel coatings obtained from any of the above aqueous coating compositions and the coated articles obtained there from.

In still another aspect of the invention, there is provided a coating composition which is highly effective as a primer for steel, galvanized steel, aluminum and other metal surfaces. According to this aspect of the invention the primer coating composition contains as the essential ingredients at least two polyfunctional organosilane compounds, such as, an aminoalkylaminoalkyltrialkoxysilane and an epoxy silane in a volatile organic solvent, especially lower alkanol solvent. The alcohol or other organic solvent mixture of the polyfunctional silane compounds is combined with a small quantity of water, as silane hydrolyzing catalyst. These primer coating compositions are free from silica and are also free from monofunctional silanes.

The present invention, including specific applications thereof, will now be described in further detail by way of specific embodiments and examples, although the invention is not limited to these specific embodiments.

DETAILED DESCRIPTION AND PREFERRED EMBODIMENTS

According to one embodiment of this invention, a coating composition is formed by admixing (A) at least one silane of the formula (1)

wherein
$R^1$ is alkyl, preferably, a $C_1$–$C_6$ alkyl group (the group may be a straight, cyclic, or branched-chain alkyl), such as methyl, ethyl, n- or iso-propyl, n- or iso-butyl, n-pentyl, cyclohexyl, and the like, preferably a $C_1$–$C_4$ alkyl group, most preferably a methyl, ethyl, propyl or butyl group), aryl, such as a phenyl, or a functional group or groups, such as vinyl, acrylic, methacrylic, amino, mercapto, or vinyl chloride functional group, and each $R^2$ is, independently, an alkyl group (i.e. a $C_1$–$C_6$ straight or branched chain alkyl group, preferably a $C_1$–$C_4$ alkyl group, such as a methyl group);

(B) base component selected from calcium, zinc and aluminum hydroxides;

(C) acid component selected from the group consisting of water-soluble organic acids (preferably alkanoic acid such as formic acid, acetic acid, propanoic acid or butyric acid, most preferably acetic acid), $H_3BO_3$ (boric acid) and $H_3PO_3$ (phosphorous acid); and (D) water.

As examples of silanes of formula (1), wherein $R^1$ is an alkyl group or aryl group, mention may be made of, for example, methyltrimethoxysilane, ethyltrimethoxysilane, ethyltriethoxysilane, n-propyltrimethoxysilane, n-propyltriethoxysilane, isopropyltrimethoxy silane, n-butyltrimethoxy silane, isobutyltrimethoxy silane, phenyltrimethoxy silane, preferably methyltrimethoxy silane. In the case where $R^1$ is a functional group, mention may be made, for example, of N-(2-aminoethyl)-3-aminopropyltrimethoxy silane, 3-mercaptopropyltrimethoxy silane, 3-mercaptopropyltriethoxy silane, 3-aminopropyltriethoxy silane, 3-(meth)acryloxypropyl trimethoxy silane, 3-(meth)acryloxypropyltriethoxy silane, n-phenylaminopropyltrimethoxy silane, vinyltriethyoxy silane, vinyltrimethoxy silane, allyltrimethoxy silane, and any of the aminosilane catalysts, described herein below as component ($B^1$).

As used herein, the expression "functional group" is intended to include any group, other than hydroxyl, (including alkoxy, aryloxy, etc.), which is hydrolyzable to provide, in situ, a reactive group (e.g., reactive hydrogen)

which will react, in other than a condensation reaction, with the substrate (e.g., metal), itself, or other reactive components in or from the coating composition.

The functional groups, in addition to the hydroxyl group (by hydrolysis of the ($OR^2$) groups), tend to form three-dimensional or cross-linked structure, as well known in the art.

Moreover, in the various embodiments of the invention, it is often preferred to use mixtures of two or more silane compounds of formula (1). Mixtures of at least phenyltrimethoxysilane and methyltrimethoxysilane are often especially preferred.

Generally, total amounts of silane compounds of formula (1) will fall within the range of from about 40 to about 90 percent by weight, preferably from about 50 to about 85 percent by weight, based on the total weight of silanes, acid component and water.

In addition to silane compound(s) of formula (1), the composition may additionally include a bistrifunctional aminosilane, such as represented by the following formula (4):

$$X[R^1Si(OR^2)_3]_2 \qquad (4)$$

where $R^1$ and $R^2$ are as defined above, and X represents an amino group (—NH) or keto group

as a basic catalyst, not requiring acid stabilization. As a representative example of aminosilane or ketosilane catalyst according to formula (4), mention may be made of, for example, bis(trimethoxypropylsilane) amine, bis(trimethoxyethylsilane) amine, di(trimethoxybutylsilane) ketone, di(trimethoxypropylsilane) ketone, and the like. The silane compounds of formula (4) function as a less active basic catalyst, not requiring acidic passivation. Minor amounts, usually from about 1 to about 10 parts, preferably, from about 2 to about 8 parts, of compound of formula (4) per 100 parts of silane compound(s) of formula (1) provide satisfactory results.

The base component (B) may be, for example, an inorganic base, such as, for example, calcium hydroxide, aluminum hydroxide or zinc hydroxide, or mixture thereof; or an organic base component, such as, for example, aminosilane.

The amount of the base component is generally, up to about 2%, such as, for example, from about 0.1 to 2.0%, by weight of the composition, especially, from about 0.2 to 1.6%.

As examples of the acid component (C), mention may be made of lower alkanoic acids, such as, for example, formic acid, acetic acid, propanoic acid, butyric acid, and inorganic acids, such as, for example, boric acid ($H_3BO_3$) or ortho-phosphorous acid ($H_3PO_3$), preferably acetic acid, boric acid or ortho-phosphorous acid, most preferably, for reasons of economy and safety, acetic acid. The acid may be added as free acid or as inorganic salt thereof, such as alkali metal (e.g., sodium), alkaline earth metal (e.g., calcium), or ammonium salt.

Generally, total amounts of the inorganic acid component will fall within the range of from about 0.3 to about 4 percent by weight, preferably from about 0.5 to about 3%, preferably, from about 0.5 to about 2.5 percent by weight, based on the total weight of silanes, acid component and water. For acetic acid, the preferred range is from about 0.1 to about 1.0 percent, preferably, from about 0.2 to about 0.7 percent, by weight, based on the total weight of the composition.

Generally, the total amount of water will fall within the range of from about 10 to about 60 percent by weight, preferably from about 10 to about 45 percent by weight, based on the total weight of silanes, acid component and water.

Some or all of the water may be provided by the acid component, when the base or acid component is supplied as an aqueous solution, e.g., 5% aqueous solution of ortho-phosphorous acid or saturated aqueous solution of boric acid (about 6% by weight of $H_3BO_3$).

Since the presence of metallic and other impurities may have an adverse effect on the properties of the resulting coatings, preferably, the water is distilled or de-ionized water.

While general and preferred ranges of amount for the film-forming and catalytic components have been described above, it will be recognized by those skilled in the art, that these amounts may be increased or decreased as necessity demands and that the optimum amounts for any particular end use application may be determined by the desired performance. In this regard, for example, when the amount of catalyst is reduced, the time to achieve freedom from tack will increase. Similarly, when the amount of the catalyst(s) is (are) increased, this may lead to increased rates of cracking, loss of adhesion and performance loss of the resulting coating.

The compositions of this embodiment may further include one or more additional additives for functional and/or esthetics effects, such as, for example, silicates, organic solvents and co-solvents, UV absorbers, metal catalysts and the like.

The above-noted optional ingredients may be used singly or in any combination in the coating composition of this invention.

As examples of silicate component, mention may be made of ethyl or methyl orthosilicate or ethyl polysilicate. These silicates may be hydrolyzed, for example, from about 28% to about 52% silica. Especially preferred in this regard is tetraethylsilicate (TEOS) which has been subjected to controlled hydrolysis, providing a mixture of TEOS and, from about 20% to about 60% polydiethoxysilane oligomers. For example, a 50% hydrolysis product may be referred to herein as "polydiethoxysilane (50%)."

Generally, total amounts of silicate component, when used, will fall within the range of from 0 to about 45 percent by weight, preferably from 0 to about 25 percent by weight, based on the total weight of silanes, acid component and water.

As examples of mono-lower alkyl ether of alkylene (e.g., ethylene) glycol, mention may be made of mono-$C_1$–$C_6$-alkyl ethers of ethylene glycol, such as, for example, monomethyl ether, monoethyl ether, monopropyl ether, monobutylether, monopentylether or monohexylether, preferably monoethyl ether of ethylene glycol.

Generally, total amounts of the mono-lower alkyl ether of ethylene glycol, when used, will fall within the range of from 0 to about 15 percent by weight, preferably from 0 to about 6 percent by weight, based on the total weight of silanes, acid component and water.

As an example of ultra-violet light absorber, mention may be made of titanium dioxide in finely powdered form, e.g., having an average particle diameter of about 20 nm. Other inorganic or organic ultra-violet light absorbers may be utilized in so far as they do not interfere with the objects of this invention.

Generally, total amounts of the ultra-violet light absorber, when used, will fall within the range of from 0 to about 10 percent by weight, preferably from 0 to about 5 percent by weight, based on the total weight of silanes, acid component and water.

As examples of organic solvents, mention may be made of lower alkanol, e.g., $C_2$–$C_4$ alkanols, preferably isopropanol. Other organic solvents, such as, for example, acetone, methyl ethyl ketone, ethyl acetate, and the like may also be used. Generally, total amounts of organic solvent, such as, lower alkanol, will fall within a range of from 0 to about 50 percent by weight, preferably from 0 to about 30 percent by weight, based on the total weight of silane(s), acid component and/or base component and water. In some cases, however, substantially higher amounts may be convenient, especially where, for example, the coating compositions are applied by spraying as an aerosol or mist.

As examples of the metal catalysts, mention may be made of (i) colloidal aluminum hydroxide, (ii) metal alcoholates, such as those represented by the following formula (2):

$$M(OR^3)_m \qquad (2)$$

where M is a metal of valence m (namely, from Groups IIIA, IVA, IIB or IVB of the periodic table of the elements), e.g., boron, titanium, aluminum, indium, yttrium, cerium, lanthanum, silicon, tin, hafnium, etc; boron, aluminum and titanium are especially preferred because the alkoxides of these metals are more readily commercially available, and tend to be non-toxic);

$R^3$ is a lower alkyl group, e.g., $C_1$–$C_6$ straight or branched chain alkyl group, preferably $C_2$–$C_4$ alkyl group, most preferably, isopropyl, isobutyl or n-butyl; and m is an integer of 3 or 4.

As specific examples of the metal alcoholates of formula (2), mention may be made of titanium alcoholates of $C_2$–$C_4$ alkanols, e.g., titanium tetraisopropoxide and titanium tetrabutoxide.

In addition, double metal alcoholates of, for example, AlTi, AlZr, AlY, MgAl, MgTi, MgZr, etc., may also be used.

The presence of the trivalent and tetravalent metal ions are especially useful for coating compositions applied to steel since they tend to form insoluble (water and alkali) iron silicates, whereas the products of divalent metals, tend to be soluble.

Generally, total amounts of the colloidal aluminum hydroxide and/or metal alcoholate, when used, will fall within the range of from 0 to about 2.5 percent by weight, preferably from 0 to about 1 percent by weight, based on the total weight of silanes, acid component and water.

Within the above general proportions, the silane component (A) may be used in an amount of from about 15 to about 25 parts by weight, preferably as a mixture of from about 15 to about 20 parts by weight of methyltrimethoxysilane and from about 1 to about 5 parts by weight of phenyltrimethoxysilane; the base component (B), when present, is used in an amount of from about 0.1 to 3 weight percent, preferably from about 0.2 to 2.5 weight percent; the acid component (C), when present, is used in an amount of from about 0.2 to about 0.8 part by weight; the water (D) is used in an amount of from about 2.5 parts by weight to about 22 parts by weight; the silicate component is used in an amount of from 0 to about 15 parts by weight; the mono-lower alkyl ether of ethylene glycol is used in an amount of from 0 to about 3 parts by weight; the ultra-violet light absorber is used in an amount of from 0 to about 2 parts by weight; and lower alkanol is used in an amount of from 0 to about 20 parts by weight; and the colloidal aluminum hydroxide and/or the metal alcoholate is used in an amount of from 0 to about 0.5 part by weight.

According to a particularly preferred embodiment of the present invention, the coating compositions may include metal catalysts which additionally provide a tint or coloration to the resulting coating. Chromium acetate hydroxide is especially useful in this regard, serving as a basic catalyst which provides a bluish tint to the resulting coating. This feature may be especially useful, for example, in connection with providing corrosion resistant coatings to articles having large surface areas and/or difficultly accessible regions, where visibility of the applied coating can assure total coverage of the areas to be coated while avoiding wasting coating by excessive applications over already coated surfaces. For instance, addition of the chromium acetate hydroxide catalyst has been successfully applied to coatings for air conditioning units and other HVAC and heat transfer coils and products, as described in Provisional Application No. 60/236,158, filed Feb. 8, 2000, and its corresponding non-Provisional Application, filed on even date herewith, titled "METHOD FOR IMPROVING HEAT EFFICIENCY USING SILANE COATINGS AND COATED ARTICLES PRODUCED THEREBY", under attorney docket number GED-6.

Other basic metal catalysts providing a colorant function include, for example, iron acetate, iron acetate hydroxide, chromium acetate, and the like. Other metal compounds such as compounds of antimony, lead, barium, etc., also form colored products, but tend to be more toxic and, therefore, less useful for general purposes.

The present coating composition may be formed by mixing the above-noted components and allowing them to react. A suitable reaction time is typically 4 to 12 hours, if no colloidal aluminum hydroxide and/or metal alcoholate is present. Shorter reaction times may be obtained in the presence of colloidal aluminum hydroxide and/or metal alcoholate.

If no lower alkanol is present, frequent shaking may be necessary to achieve a shorter reaction time.

For ease of handling, the coating composition may be provided as a two or three container system, e.g., the silane component and any silicate component, if present, being provided in a first container and all other components being provided in a second or second and third container. The water may be provided separately from the other components. The contents of the two or three containers may be mixed shortly prior to use and allowed to react for an appropriate reaction time, as noted above.

In accordance with another embodiment of the invention, especially suitable for use in coating steel based substrates, because no acid component is used, a coating composition is prepared by admixing (A) at least one silane of the formula (1)

$$R^1Si(OR^2)_3 \qquad (1)$$

wherein $R^1$ and $R^2$ are as defined above, (B) base component, especially hydroxides of calcium, zinc, and aluminum;

(E) epoxysilane; and (D) water.

In this embodiment, the components (A), (B) and (E) may be any of those described above in connection with the first embodiment. Similarly, one or more of the other optional ingredients, including, for example, the amino or keto silane compounds of formula (4), silicate component (F), metal alcoholate catalyst of formula (2), monoloweralkyl ether of alkylene glycol, UV absorbers, solvents and co-solvents, etc., which may be included in the coating compositions of the first embodiment may similarly be used in the coating compositions of the second embodiment.

As the epoxy silane, component (E), mention may be made of, for example, glycidoxy($C_1$–$C_6$-alkyl)(tri-$C_1$–$C_3$alkoxy)silane, such as, 3-glycidoxypropyltrimethoxysilane, 3-glycidoxypropyldiisopropylethoxysilane, (3-glycidoxypropyl)methyldiethoxysilane, 3-glycidoxypropyltriethoxysilane, and epoxy-functional silane compounds represented by the formula (3)

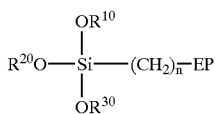

(3)

wherein $R^{10}$, $R^{20}$ and $R^{30}$, independently, represent aliphatic or aromatic groups, especially, lower alkyl of from 1 to 6 carbon atoms, preferably $C_1$–$C_3$ alkyl;

EP represents glycidyl (e.g., glycidyloxy), cyclohexane oxide (epoxycyclohexyl) or cyclopentane-oxide (epoxycyclopentyl); and n is a number of from 1 to 4, preferably 1, 2 or 3.

As examples of the epoxy functional compounds represented by formula (3), mention may be made of, for example, gamma-glycidyloxymethyltrimethoxysilane, gamma-glycidyloxymethyltriethoxysilane, gamma-glycidoxymethyl-tripropoxysilane, gamma-glycidoxymethyl-tributoxysilane, beta-glycidoxyethyltrimethoxysilane, beta-glycidoxyethyltriethoxysilane, beta-glycidoxyethyl-tripropoxysilane, beta-glycidoxyethyl-tributoxysilane, beta-glycidoxyethyltrimethoxysilane, alpha-glycidoxyethyl-triethoxysilane, alpha-glycidoxyethyl-tripropoxysilane, alpha-glycidoxyethyltributoxysilane, gamma-glycidoxypropyl-trimethoxysilane, gamma-glycidoxypropyl-triethoxysilane, gamma-glycidoxypropyl-tripropoxysilane, gamma-glycidoxypropyltributoxysilane, beta-glycidoxypropyl-trimethoxysilane, beta-glycidoxypropyl-triethoxysilane, beta-glycidoxypropyl-tripropoxysilane, beta-glycidoxypropyl-tributoxysilane, alpha-glycidoxypropyl-trimethoxysilane, alpha-glycidoxypropyl-triethoxysilane, alpha-glycidoxypropyl-tripropoxysilane, alpha-glycidoxypropyl-tributoxysilane, gamma-glycidoxybutyl-trimethoxysilane, delta-glycidoxybutyl-triethoxysilane, delta-glycidoxybutyl-tripropoxysilane, delta-glycidoxybutyl-tributoxysilane, delta-glycidoxybutyl-trimethoxysilane, gamma-glycidoxybutyl-triethoxysilane, gamma-glycidoxybutyl-tripropoxysilane, gamma-alpropoxybutyl-tributoxysilane, delta-glycidoxybutyl-trimethoxysilane, delta-glycidoxybutyl-triethoxysilane, delta-glycidoxybutyl-tripropoxysilane, alpha-glycidoxybutyl-trimethoxysilane, alpha-glycidoxybutyl-triethoxysilane, alpha-glycidoxybutyl-tripropoxysilane, alpha-glycidoxybutyl-tributoxysilane, (3,4-epoxycyclohexyl)-methyl-trimethoxysilane, (3,4-epoxycyclohexyl)methyl-triethoxysilane, (3,4-epoxycyclohexyl)methyl-tripropoxysilane, (3,4-epoxycyclohexyl)-methyl-tributoxysilane, (3,4-epoxycyclohexyl)ethyl-trimethoxysilane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexyl)butyl-triethoxysilane, (3,4-epoxycyclohexyl)butyl-tripropoxysilane, (3,4-epoxycyclohexyl)butyl-tributoxysilane.

The amount of the components (A), (B) and (D) may generally be the same amounts as previously disclosed for the first embodiment.

The amount of component (E) epoxysilane will generally be within the range of from about 1 to about 22 percent by weight, preferably, from about 2 to 16% by weight, based on the total weight of the composition.

According to still another embodiment of the invention, an aqueous silane-based coating composition is formed by admixing as component (A) at least one organosilane of formula (1), as given above; (D) water; (J) (i) colloidal aluminum hydroxide or (ii) metal alcoholate of the previously given formula (2) or a mixture of (i) and (ii). Additional silane hydrolyzing catalyst, including, for example, the compound of formula (4), or any of the other disclosed aminosilane catalysts, effective to inhibit gellation, may also be added in order to inhibit gellation and, thereby extend storage life and pot life.

As examples of the organosilanes of formula (1) and metal alcoholate of formula (2) the same compounds as mentioned above may be used. Generally, the amount of organosilane(s) of formula (1) will be from about 10 to 50%, preferably, 12 to 35%, and the amount of the component (J) will be from about 0.05 to about 1.0 percent, preferably, from about 0.1 to about 0.8%, each based on the total weight of the composition.

Representative of the additional silane hydrolyzing agent and gellation inhibitor, the aforementioned epoxide silanes (E) are especially preferred.

In another embodiment, an aqueous organosilane coating composition is formed by admixing (A) at least one organosilane of formula (1); (H) lower alkanol solvent; (D) water; and (K) chromium acetate hydroxide or other silane polymerization catalyst which will provide coloration to the resulting coating.

The amount of the component (K) is, usually, up to about 2 percent by weight of the coating composition, preferably from about 0.1 to about 1.8%, especially, from about 0.4 to about 1.3% by weight, based on the total weight of the coating composition.

Here again, one or more optional ingredients, such as those discussed in connection with other embodiments, may also be included in the compositions of this embodiment.

According to another embodiment of the invention, an aqueous based organosilane coating composition is formed by admixing (A) at least one organosilane of formula (1); (D) water; (F) alkali metal silicate, preferably pre-hydrolyzed; (H) lower alkanol solvent; (J) (i) the aforementioned metal catalyst (i) colloidal aluminum hydroxide; (ii) metal alcoholate of formula (2) as given above, or (iii) mixture of (i) and (ii).

The components of the compositions of this embodiment, like those of the previous alternatives, may be selected from the same components and in the same amounts as previously described.

In accordance with still another embodiment of the invention, an aqueous organosilane coating composition is formed by admixing (A) at least one organosilane of formula (1); (B') at least one basic amine silane catalyst, (D) water, (E) epoxide silane: and (H) lower alkanol solvent.

As examples of the basic amine silane catalyst, (B'), mention may be made of, for example, aminoethyltriethoxysilane, beta-amino-ethyltrimethoxysilane, beta-aminoethyl-triethoxysilane, beta-amino-ethyl-tributoxysilane, beta-aminoethyltripropoxysilane, alpha-aminoethyl-trimethoxysilane, alpha-aminoethyl-triethoxysilane, gamma-aminopropyltrimethoxysilane, gamma-aminopropyl-triethoxysilane, gamma-aminopropyl-tributoxysilane, gamma-amino-propyltripropoxysilane, beta-aminopropyl-trimethoxysilane, beta-aminopropyl-triethoxysilane, beta-amino-propyltripropoxysilane, beta-aminopropyl-tributoxysilane, alpha-aminopropyl-trimethoxysilane, alpha-aminopropyltriethoxysilane, alpha-aminopropyl-tributoxysilane, alpha-aminopropyl-tripropoxysilane, N-aminomethylaminoethyl-trimethoxysilane, N-aminomethylaminomethyl-tripropoxysilane, N-aminomethyl-beta-aminoethyl-trimethoxysilane, N-aminomethyl-beta-aminoethyl-triethoxysilane, N-aminomethyl-beta-aminoethyl-tripropoxysilane, N-aminomethyl-gamma-aminopropyl-trimethoxysilane, N-aminomethyl-gamma-aminopropyl-triethoxysilane, N-aminomethyl-gamma-aminopropyl-tripropoxysilane, N-aminomethyl-beta-aminopropyl-trimethoxysilane, N-aminomethyl-beta-aminopropyl-triethoxysilane, N-aminomethyl-beta-aminopropyl-tripropoxysilane, N-aminopropyltripropoxysilane, N-aminopropyl-trimethoxysilane, N-(beta-aminoethyl)-beta-aminoethyl-trimethoxysilane, N-(beta-aminoethyl)-beta-aminoethyl-triethoxysilane, N-(beta-aminoethyl)-beta-aminoethyl-tripropoxysilane, N-(beta-aminoethyl)-beta-aminoethyl-trimethoxysilane, N-(beta-aminoethyl)-alpha-aminoethyl-triethoxysilane, N-(beta-aminoethyl)-alpha-aminoethyl-tripropoxysilane, N-(beta-aminoethyl)-beta-aminopropyl-trimethoxysilane, N-(beta-aminoethyl)-gamma-aminopropyl-triethoxysilane, N-(beta-aminoethyl)-gamma-aminopropyl-tripropoxysilane, N-(beta-aminoethyl)-gamma-aminopropyl-trimethoxysilane, N-(beta-aminoethyl)-beta-aminopropyl-triethoxysilane, N-(beta-aminoethyl)-beta-aminopropyl-tripropoxysilane, N-(gamma-aminopropyl)-beta-aminoethyl-trimethoxysilane, N-(gamma-aminopropyl)-beta-aminoethyl-triethoxysilane, N-(gamma-aminopropyl)-beta-aminoethyl-tripropoxysilane, N-methyl aminopropyl trimethoxysilane, beta-aminopropyl methyl diethoxysilane, gamma-diethylene triaminepropyltriethoxysilane, and the like.

Of these, 3-(2-aminoethylamino)propyltrimethoxy silane [also known as N-(2-aminoethyl)-3-aminopropyltrimethoxysilane], and 3-aminopropyltrimethoxy silane, are especially preferred.

Aminosilanes of formula (4), above, may also be used.

For the components (A), (D), (E) and (H), the representative examples and amounts given above apply equally to this embodiment.

In accordance with still another embodiment of the invention, a multivalent catalyst system may be used to polymerize the organosilane of formula (1). For example, the mixed multivalent catalyst may include a divalent metal compound, such as hydroxide or carbonate of calcium, magnesium or other alkaline earth metal; a trivalent metal compound, such as, for example, boric acid or other compound of boron or aluminum; and a tetravalent metal compound, such as a compound of formula (2-a):

$$M^1—(OR^3)_4 \quad (2\text{-}a)$$

where $M^1$ represent a tetravalent metal, such as titanium, or zirconium, and $R^3$ is as previously defined.

According to this embodiment, the proportions of the respective catalysts may be selected based on the desired properties but generally in terms of metal ions, weight ratios of $M^{+2}:M^{+3}:M^{+4}$ of from about 0.1–1:0.05–1:0.1–2, preferably from about 0.4–1:0.2–1:0.5–1, provide good results.

The multivalent catalyst system may be used with any of the coating compositions described herein.

In one particular embodiment of the invention the subject formulations are aqueous alcoholic formulations effective for providing clear, hard and strongly adherent corrosion resistant coatings for glass substrates, e.g., windows, mirrors, counter-tops, table-tops, and the like, and also for providing clear, hard, glossy and slick (slippery or wax-like) adherent corrosion resistant coatings for metal surfaces, e.g., automobiles, trucks, buses, trains, and other vehicles, metal signs, and the like. According to this aspect of the invention, the coating composition contains as the essential and major film-forming components, a mixture of silane compounds of above formula (1), wherein $R^1$ in a first silane compound is a lower alkyl group, such as methyl or ethyl while in a second silane compound, $R^1$ is an aryl group, especially, phenyl. The ratio of the first silane compound to second silane compound is not particularly critical and may, generally, fall within a range of from about 3:1 to about 1:3, preferably, from about 1.5:1 to about 1:1.5, such as about 1:1, on a weight basis.

This composition will also include a small amount of moderately alcohol soluble to alcohol soluble basic activator for the silanes (either in the container, or in situ), especially, calcium hydroxide or tetramethylammonium hydroxide. Generally, an amount of calcium hydroxide, in the range of from about 0.4 to about 4, preferably, from about 1.2 to about 2.8 parts of basic activator, per 100 parts, in total, of silane compounds of formula (1), will provide satisfactory results. Since tetramethylammonium hydroxide tends to be more active and more soluble in alcohol than calcium hydroxide, smaller amounts of this basic activator, should be useful, for example, from about 0.01 to about 2, preferably, from about 0.02 to about 1 part of tetramethylammonium hydroxide, per about 100 parts of silane compounds of formula (1), should provide satisfactory results.

For this particular embodiment, it is expected that monovalent alkalis, such as, for example, sodium hydroxide, potassium hydroxide, and the like would be too active for easy application of the composition, while many other less active alkalies, could require addition of acid catalyst to promote the reaction, and therefore, would also not be preferred for the intended applications to glass or painted metal substrates.

These formulations also include a silicate, preferably, partially hydrolyzed silicate, such as, for example, hydrolysis product of tetraethylsilicate, e.g., polydiethoxysiloxane (about 50% solids). Amounts of the silicate, on a solids basis, per 100 parts of silane compounds of formula (1), will usually fall within the range of from about 1 to 16 parts, preferably, from about 2 to about 10 parts, more preferably, from about 4 to about 8 parts.

The film-forming and catalyst ingredients are added to lower alcohol solvent, preferably, isopropyl alcohol. Relatively dilute solutions facilitate application by wiping (e.g., using a soft cloth, sponge, etc.) or spraying. Generally, from about 600 up to about 1500 parts of alcohol per 100 parts of silane compounds of formula (1) provide satisfactory results.

An optional ingredient for this formulation is γ-glycidyloxypropyltrimethoxysilane, or other epoxy silane compound, such as mentioned above.

As described above, the coating compositions of this invention may be applied to a wide range of painted and non-painted metallic, non-metallic, e.g., siliceous, ceramic, vitreous substrates, including, for example, and not by way of limitation, iron, steel, aluminum, copper, brass, bronze, other alloys, plastics, e.g., polyolefins, polyesters, polyamides, polyimides, polycarbonates, polyetherimides, polysulfones, and the like, concrete, glass, alkali metal silicates, and the like. It is particularly advantageous that the compositions of this invention can be applied to even rusted metal substrates, e.g., rusted iron or steel, and still provide strongly adherent and durable, corrosion resistant coatings, especially if the substrate is prewashed, such as, for example, with a composition comprising water, isopropyl alcohol and acetic acid (e.g., from about 80 to about 95 parts, preferably about 85 to about 92 parts, e.g., 89 parts, water; from about 4.9 to about 19 parts, preferably about 8 to about 14 parts, e.g., 10 parts, isopropyl alcohol; and from about 0.1 to about 6, preferably about 0.5 to about 3, such as 1 part, acetic acid). The coating compositions of this invention when applied to a substrate, such as those mentioned herein, will readily penetrate even narrow and microscopic crevices or pores of the substrate, to form strong adherent bonds with the substrate. Although not wishing to be bound by any particular theory of operation, it is believed that the penetration and adherent bond formation is achieved, in part, because of the absence of large organic molecules from the invention coating systems.

The coating compositions contemplated herein may be formulated as solventless, aqueous or non-aqueous systems (although, in most cases, at least a catalytic amount of water is eventually added, directly or taken from the atmosphere). For example, the solventless systems may contain a mixture of methyltrimethoxysilane and phenyltrimethoxysilane and, catalyst, e.g., metal alcoholate, such as, for instance, tetrabutoxytitanate. The solventless systems have been applied to brass and bronze substrates to provide extremely durable and corrosion resistant coatings (i.e., withstanding exposure to over 4000 hours of salt water spray with no visible change). Suitable non-aqueous systems (e.g., by addition of small amounts of diluent, especially, lower alcohol, such as, isopropanol), may also be used, and such non-aqueous systems are described in the Applicant's aforementioned commonly assigned co-pending Provisional application Ser. No. 60/185,367, filed Feb. 28, 2000, the disclosure of which is incorporated herein in its entirety, by reference thereto.

The coating composition may be applied in any conventional manner, preferably by dipping, wiping, brushing or spraying. Preferably, the spraying is carried out under an inert atmosphere, especially using dry $N_2$ propellant, as a result of which extra gloss and hardness is imparted to the resulting coating. Although the reason for this has not been ascertained, it is presumed that nitrogen impacting the substrate surface removes at least some of the adsorbed oxygen and water, while at the same time, its positive Joule-Thomson coefficient retards solvent evaporation and promotes film generation. Therefore, since any such adsorbed oxygen and/or water would be expected to impair the qualities of the resultant coating, the removal thereof by the $N_2$ gas stream, would tend to improve the qualities of the coating, including gloss and hardness.

The present invention also provides corrosion resistant primer coating compositions which are not only strongly adherent to a broad range of metal substrates, including, for example, aluminum, steel and galvanized steel, but also to a broad range of pigmented and unpigmented topcoat materials, including, for example, polyurethane resins, epoxy resins, acrylic resins, polyester resins, alkyd resins, polyetherpolyester resins, polycarbonate resins, and the like. Accordingly, the primer compositions of this invention can be used without any other tie-coat material.

According to this aspect of the invention, the primer composition is prepared by admixing two or more polyfunctional organosilanes as previously described. Monofunctional (e.g., organosilanes of formula (1) where $R^1$ is alkyl or aryl) are not included in the primer composition. Silica and silicate or precursors thereof are also not included in the primer compositions.

At least one of the polyfunctional organosilanes will preferably include polyamino group as $R^1$ in formula (1), namely, aminosilanes of the following formula (1-A)

$$H_2N\text{---}R_a\text{---}NH\text{---}R_b\text{---}Si(OR^2)_3 \quad (1\text{-A})$$

where $R_a$ and $R_b$ are each, independently, alkyl of from 1 to 6 carbon atoms, preferably 1 to 4 carbon atoms, especially 2 to 4 carbon atoms; and $R^2$ is as defined above.

Aminoethylaminopropyltrimethoxysilane, aminoethylaminobutyltrimethoxysilane, aminoethylaminopropyltriethoxysilane, can be mentioned as representative of aminosilane compounds of formula (1-A).

While the polyaminopolyfunctional organosilanes are preferred, other polyfunctional organosilanes, such as vinylsilanes, acrylic silanes, methacrylic silanes, and the like, as described above, may be used in place of, or in addition to, the polyaminopolyfunctional organosilanes.

At least one other polyfunctional organosilane which is an epoxysilane, including any of the epoxysilanes as component (D) mentioned above, is also preferably included as one of the polyfunctional organosilanes of the primer coating composition. Especially, mention may be made of the glycidyloxy ($C_1$–$C_6$-alkyl)(tri-$C_1$–$C_3$ alkoxy) silanes, such as 3-glycidyloxypropyltrimethoxysilane, for inclusion in the primer coating composition.

Suitable amounts of the polyfunctional organosilanes in the primer coating composition, as solids (non-volatile silanol condensation products after addition of water) will generally range from about 1% to about 20%, by weight, preferably from about 2 to about 15%, more preferably from about 4 to 12%, by weight, of the composition. These amounts will typically, for a primer containing two of the polyfunctional silane compounds, correspond to from about 2 to about 40%, preferably from about 4 to about 30%, more preferably from about 8 to about 24%, by weight, of the total composition, in the as prepared composition, before water addition.

Thus, in a preferred composition containing a mixture of (a) polyaminoorganosilane and (b) glycidyloxyorganosilane, in appropriate volatile organic solvent, preferably isopropyl alcohol, the total amount of (a) plus (b) is preferably from about 5 to about 25 parts, more preferably, from about 10 to about 20 parts, per 100 parts of volatile organic solvent. Furthermore, weight ratios of (a):(b) in the range of from about 1:0.4 to 2, preferably 1:0.6 to 1.4, have been found to provide especially good results.

In use, the organic solvent, e.g., isopropyl alcohol, solution of the polyfunctional organosilanes, is thoroughly mixed with a small amount of water to catalyze the hydrolysis reaction. The resulting formulation is then generally ready to be applied to the substrate in from about 5 minutes to about 1 hour, typically, in about 10 to about 30 minutes, such as about 15 minutes.

Only a minor amount of water, such as from about 1 to 2 parts water per 100 parts of solution (e.g., from about 0.5 to 1.0 parts water per 10 parts polyfunctional silanes) will be sufficient to catalyze the hydrolysis reaction.

The primer composition may be applied to the substrate in any convenient manner, such as by wiping, brushing, dipping and spraying. Since the subject primer coating compositions do not form lumps, it is easy and convenient to apply by spraying, for example, using a number 4–6 nozzle with a pressure of about 20 psi. Preferably, the spray is in the form of a mist. It is not necessary to apply the composition uniformly since the coating will tend to flow together to provide a uniform continuous film.

Although the precise nature of the resulting primer coating is not known, it will be recognized by those skilled in the art that the polyfunctional silanes provide multiple reactive sites for adhering to the substrate, to itself and each other, as well as to the subsequently applied top coat.

Presumably, because of the strong adhesion to the substrate, resulting from the multiple reactive sites, the primer coating is extremely corrosion resistant, as will be shown from the examples provided hereinafter. Accordingly, the primer coating compositions of this invention can be used for many different applications where exposure to alkali and/or acid corrosive agents is anticipated, for example, in the automotive industry as a primer for resin paint finishes.

Generally speaking, the silane coating compositions according to the present invention have a broad scope of useful applications. The following are representative, but non-limiting, examples of applications in which one or more of the compositions, as described above, and in the following Examples, have been or may be used, with good results.

1. Protection of aluminum, steel, galvanized steel, stainless steel, brass, bronze, copper, silver, and other metals, from corrosive environments, including, as examples, salt water, hydrochloric acid, sulfuric acid, phosphoric acids, and the like.
2. Protection of interior and exterior building materials, such as, for example, ceramic roofing tiles, concrete, and galvanized steel, including interior surfaces of duct works, from deposition and growth of mildew and infectious organisms.
3. Overcoating and/or removal of graffiti from coated or uncoated concrete and metallic surfaces, without sacrificing the coating, when present.
4. Corrosion protection and maintenance of cooling and heating efficiencies of HVAC and other heat exchange equipment.
5. Corrosion resistant primer for various finishes, including, for example, urethane, epoxy, polyester, latex, and the like.
6. Overcoating for automotive and truck (e.g., cement truck), bus, and other vehicle, finishes.
7. Corrosion protection for food and beverage container surfaces in contact with foods, beverages, and the like, e.g., aluminum cans.
8. Overcoating and containing rust.
9. Coating fasteners, e.g., screws, bolts, rivets, and the like.
10. Barnacle release agent.
11. Protective, corrosion resistant and release surface, for manifolds, exhaust systems, cooking utensils, ovens, and other equipment exposed to temperature extremes.
12. Corrosion protection and/or deicing agent for aircraft wings and other surfaces.
13. Coating for glass surfaces in coastal environments to facilitate cleaning.
14. Wipe-on finish protector and refurbisher for automotive and other vehicle, equipment finishes.
15. Gel-coat maintenance finish.
16. Protective coating for maintaining asphalt tiles.

For any of the above applications, only thin coatings, on the order of about 2000 nm, or less, will provide good results. Generally, the coating compositions of the present invention are effective when applied to a coating (film) thickness (after cure) in the range of from about 5 to about 150 millionths of an inch, however, if desired to provide even superior corrosion protection, thicker films may be applied.

The following examples are illustrative and are not intended to limit the invention in any way. Unless stated otherwise, all parts and percentages are by weight. In the following examples the water used is distilled or deionized water.

EXAMPLE 1

In a first container, methyltrimethoxysilane, phenyltrimethoxysilane and propyltrimethoxysilane are mixed in amounts of 15 parts, 1 part and 5 parts, respectively. In a second container, aminoethylaminopropyltrimethoxysilane {N-(2-aminoethyl)-3-amino-propyltrimethoxysilane}, water, acetic acid, and titanium dioxide (average particle size, 22 nm), are mixed in amounts of 0.2 part, 13 parts, 0.4 part, and 0.2 part, respectively. After combining the contents of the two containers, the resulting mixture is allowed at least four hours to homogenize. Faster homogenization will be achieved by using a mechanical shaker or stirrer. The so-formed liquid mixture may be applied by wiping, foam brushing, conventional brushing or spraying using dry nitrogen as propellant to boats or automobiles for restoration. After 24 hours, the reaction may be applied to, for example, boats and automobiles. The resulting coatings perform satisfactorily for over one year without visual change. In this example, the titanium dioxide functions as a UV absorber. The $TiO_2$ may, however, be omitted, with similar results by replacing acetic acid with an equivalent amount of metal alcoholate, such as tetrabutoxy titanate.

EXAMPLE 2

In a first container, phenyltrimethoxysilane, methyltrimethoxysilane and tetrabutoxy titanate are mixed in amounts of 5 parts, 15 parts and 0.3, 0.4, 0.5 or 0.6 part, respectively. In a second container, isopropyl alcohol and an aqueous 3% boric acid solution are mixed in amounts of 13 parts and 13 parts, respectively. After combining the contents of the two containers, the resulting mixture is ready for application after about three hours. The resulting mixture may be applied, for example, to aluminum, brass, bronze, copper, silver, steel, stainless steel or galvanized steel, by spraying (e.g., with $N_2$ propellant) to provide corrosion protection, including in saline atmospheres, such as, for example, on boats, ships and aircraft. This composition may also be advantageously applied to food and beverage container surfaces that come into contact with foodstuffs, beverages, and the like, e.g., aluminum cans.

EXAMPLE 2A

The procedure of Example 2 is generally followed, except that isopropyl alcohol is omitted. To 15 parts methyltrimethoxysilane, there is added, while stirring, 5 parts propyltrimethoxysilane or 5 parts phenyltrimethoxysilane. To this mixture, 0.3 parts boric acid is added followed by addition of 0.2 to 0.3 parts tetrabutoxytitanate.

The mixture is allowed to clear. Then, 10 to 13 parts of water is added slowly to avoid excessive heat build-up. The resulting composition may be applied to a substrate while it is still warm or after further heating by reaction. Alternatively, the composition may be stored and applied after as long as about 6 days after water addition. Application may be by spraying, wiping, brushing ,etc.

EXAMPLE 2B

As another example of an organic-solvent free composition of this invention, a mixture of 15 parts methyltrimethoxysilane and 5 parts phenyltrimethoxysilane is combined with 0.2 to 0.35 parts of tetrabutoxytitanate. While stirring, 2.4 parts water is added. After about 15 minutes the resulting composition is ready to be applied to a metal or non-metal substrate.

This composition may be used, for example, on brass, steel and stainless steel substrates, including as an over coating for stainless steel primed with the primer composition of this invention, see, e.g., Example 30, below. Similarly, this composition may be used as an overcoat for primed aircraft wings or other surfaces for corrosion protection and/or as deicing agent. When applied as an overcoating layer for substrates primed with a primer coating of this invention, this coating is also useful for protection corrosion resistance and as release surface for high temperature applications, such as manifolds, exhaust systems, cooking utensils, ovens, and the like.

Other applications for the coating composition of this example include, for instance, corrosion protection for food and beverage container surfaces that come into contact with foods, beverages and the like, especially aluminum cans.

The coating composition of this example may be used, for example, for corrosion protection of aluminum substrates, including in saline atmospheres, such as may be encountered on boats, ships and aircraft.

This composition may also be advantageously applied for the protection of interior and exterior building materials from, for example, deposition and growth of mildew or infectious organisms, especially in salt air environments, such as coastlines, industrial areas and the like. For instance, the composition may be used to coat ceramic roofing tiles, concrete, galvanized steel, duct works (e.g., interior surfaces), etc.

Another application of the coating composition of this and other examples given above and hereinafter, especially when used as a topcoat in combination with the primer compositions of this invention, is for corrosion protection and/or as deicing agent for aircraft wings and other surfaces exposed to subfreezing temperatures.

EXAMPLE 3

5 parts of phenyltrimethoxysilane are added to a container containing 15 parts methyltrimethoxysilane. While mixing, 0.3 part of tetrabutoxy titanate are added, along with 2 parts of polydiethylsiloxane (approx. 50%), and 15 parts of isopropyl alcohol. After mixing, 10 parts of an aqueous 3% boric acid solution are added and, after waiting eight hours, the resulting coating composition is applied, by dipping or spraying (with $N_2$ propellant), to steel, aluminum and brass coupons. The cured compositions will be corrosion resistant.

In this example, similar results will be obtained when, instead of 0.3 part of tetrabutoxy titanate, 0.4, 0.5 or 0.6 part of tetrabutoxy titanate are used.

EXAMPLE 4

17 parts methyltrimethoxysilane, 3 parts phenyltrimethoxysilane, 20 parts isopropyl alcohol and 2.5 parts polydiethylsiloxane (~50%), are mixed. 5 parts of an aqueous 5% solution of phosphorous acid are added, and allowed to react, to form a coating composition.

EXAMPLE 5

16 parts of methyltrimethoxysilane and 5 parts of propyltrimethoxysilane are mixed in a first container. 20 parts of isopropyl alcohol, 10 parts of polydiethylsiloxane, which has been hydrolyzed to 52% silica, and 5 parts of an aqueous 1.25% solution of phosphorous acid are mixed in a second container. The contents of the two containers can then be mixed together and allowed to react to form a coating composition.

EXAMPLE 6

0.2 part of aminoethylaminopropyltrimethoxysilane, 0.4 part of acetic acid and 13 parts of water are mixed in a first container. 15 parts of methyltrimethoxysilane, 1 part of phenyltrimethoxysilane and 5 parts of propyltrimethoxysilane are mixed in a second container. The contents of the two containers can then be mixed together and allowed to react to form a coating composition.

EXAMPLE 7

10 parts of a 3% boric acid solution are placed in a first container. 20 parts of methyltrimethoxysilane, 10 parts of isopropyl alcohol and 0.5 part of tetrabutoxy titanate are mixed in a second container. The contents of the two containers can then be mixed together and allowed to react to form a coating composition.

By eliminating isopropyl alcohol, the rate of emulsification can be increased by increasing batch size.

EXAMPLE 8

15 parts of methyltrimethoxysilane, 5 parts of isobutyltrimethoxy- silane and 1.1 parts of polydiethylsiloxane (~50%), are mixed in a first container. 0.2 part of aminoethylaminopropyltrimethoxysilane, 0.4 part of acetic acid, 13 parts of water, 1.5 parts of ethylene glycol monoethyl ether and 0.5 part of titanium dioxide (average particle size of 22 nm) are mixed in a second container. After mixing, the contents of the two containers will react to form a coating composition.

EXAMPLE 9

20 parts methyltrimethoxysilane and 20 parts isopropyl alcohol are mixed to form a homogeneous silane-alcohol solution. Six (6) parts of a saturated solution of calcium hydroxide is added to catalyze the silane-alcohol solution. The reaction is allowed to proceed until the temperature peaks before acidifying. The reaction time may be longer or shorter, depending on the batch size, since the exothermic reaction temperature is dependent on batch size. Moreover, for batch sizes of about 1 liter or more, artificial cooling may be required.

Increased stability may be obtained by adding 0.3 part of acetic acid in place of the 0.6 grams of chromium acetate.

This coating composition may be used, for example, for protection of interior and exterior building construction materials; as a washable overcoating for protection of surfaces, such as concrete and metallic surfaces, subject to application of undesirable graffiti or otherwise which may be subject to repeated solvent cleaning operations; as an overcoating for protection of finishes on automotive, truck (including construction trucks, such as cement trucks), buses and other vehicles; as protection of surfaces on containers that come into contact with foodstuffs and beverages, especially aluminum cans; as a protective, corrosion resistant and release surface coating for surfaces exposed to high temperatures, such as, for example, manifolds, exhaust systems, cooking utensils, ovens, etc.; for corrosion protection and/or deicing agent for aircraft wings and other surfaces facing exposure to subfreezing temperatures (especially as an overcoating in combination with the primer compositions of this invention); as a wipe-on finish protector and refurbisher for automotive and other vehicle equipment finishes; as a gel-coat maintenance finish; and the like.

EXAMPLE 10

In this example the procedure of Example 9 is repeated except that instead of catalyzing the silane-alcohol mixture with calcium hydroxide a mixture of 0.15 molar $Ca(OH)_2$ and 0.08 molar $Zn(OH)_2$ is used. After addition of the base catalysts the resulting solution is allowed to react for about 1 hour and is then applied to a steel substrate using dry $N_2$ as propellant, to a coating thickness of 0.5 mil. The coating is cured by baking at 80° C. for 5 minutes or at 62° C. for 20 minutes. The resulting cured coating is able to withstand immersion in 5% HCl for at least 45 minutes before failure.

To the unused portion of the base catalyzed reaction mixture 0.2 grams of acetic acid may be added to inhibit gellation. After standing for from 3 to 5 days the composition may be applied to an aluminum or other substrate. The coating may be allowed to cure, under ambient conditions.

EXAMPLE 11

20 parts of methyltrimethoxysilane, 10 parts of isopropyl alcohol and 0.2 parts of magnesium ethoxide are mixed until the solution becomes homogeneous. A base catalyst (a saturated solution of a mixture of calcium hydroxide, calcium carbonate and magnesium carbonate, diluted with 2 parts water), is then added, and the resulting formulation is allowed to react for about 1 hour.

The resulting mixture may be applied to steel substrate to a thickness of about 1 mil or less, and baked at about 150° C. for about 5 minutes. The resulting coating will be able to withstand immersion in 5% HCl for at least 15 minutes without change.

To extend pot life, 0.3 parts of 3-glycidoxypropyltrimethoxysilane, mixed with 10 parts of isopropyl alcohol, is added to the catalyzed reaction mixture. After hydrolysis, the resulting coating composition may be applied by spraying on steel and aluminum coupons.

EXAMPLE 12

A silane-alcohol mixture is prepared as in Example 9 (Pot A). Separately, there is prepared a mixture (Pot B) obtained by combining 11.3 parts of a 3% solution of boron methoxide in isopropyl alcohol, 2 parts of polydiethoxysiloxane (~50% solids), 0.4 parts of tetrabutoxytitanate, and 2 parts of methyltrimethoxysilane. The mixture in Pot B is allowed to react for 24 hours and is then added to the silane-alcohol solution in Pot A. The resulting mixture of Pots A and B may be applied to steel and aluminum coupons by spraying under dry $N_2$ propellant to form a coating.

EXAMPLE 13

To a base catalyzed reaction mixture prepared in the same way as in Example 10 (Pot A), there was added the contents of Pot B, obtained in the same way as for Pot B in Example 12, except that in place of the 0.4 parts of tetrabutoxytitanate, 0.44 parts of iron ethoxide is used. Similar results to the results of Example 12 will be obtained.

EXAMPLE 14

After thoroughly mixing 20 parts methyltrimethoxysilane with 10 parts isopropyl alcohol, 0.2 parts of aminoethylaminopropyltrimethoxysilane is added to the resulting silane-alcohol mixture, and again thoroughly mixed. Then 6 parts of water is added to the resulting mixture and, after standing for 90 minutes, the resulting coating composition is applied to steel and aluminum coupons by spraying using dry nitrogen propellant.

The resulting coatings may be allowed to cure under ambient conditions to form acid resistant.

The above coating composition may be stabilized to obtain a longer pot life, using any of the stabilizers as shown, for example, in any of the preceding examples, including, acetic acid, chromium acetate hydroxide, 3-glycidyloxypropyltrimethoxysilane (phenyltrimethoxysilane).

EXAMPLE 15

The procedures of Example 14 are repeated except that in place of 3-(2-aminoethylamino)propyltrimethoxysilane, an equal amount of 3-aminopropyltrimethoxysilane is used with similar results being obtained.

EXAMPLE 16

20 parts of methyltrimethoxysilane and 20 parts isopropyl alcohol are mixed and the resulting mixture is combined with 0.25 parts of aluminum isopropoxide under stirring until the aluminum isopropoxide is partially dissolved. To this mixture 6 parts water is added. After stirring for about one hour, the mixture is ready for applying to the intended substrate, by brushing, spraying, etc. To extend pot life, phenyltrimethoxysilane may be introduced to the coating composition.

EXAMPLE 17

140 parts methyltrimethoxysilane and 140 parts isopropyl alcohol are mixed and catalyzed using 2.8 parts of aluminum isopropoxide. The resulting mixture is stirred until the catalyst is dissolved, after which 42 parts of water are added. The reaction is complete when the mixture is nearly at room temperature. The reaction mixture is applied, by spraying, using dry $N_2$ propellant, to galvanized iron, and to the inside of aluminum cans, e.g., as can inner liner. In the case of the galvanized iron, the coating is allowed to cure at ambient over 7 days. For the aluminum can, curing is by heating at 150° C. for 2 minutes.

The coatings of this and the other examples, do not include large organic (i.e., insulating) molecules and tend to be good conductors of electrical charge and may be applied to various electric appliances, such as power boxes, to provide a corrosion resistant coating which does not interfere with the flow of electric current. Similarly, the compositions of the present invention may be applied as very thin coatings, on the order of about 2000 nm or less, they tend to be good thermal conductors. Therefore, they are highly useful for providing corrosion resistance to HVAC units and other heat transfer surfaces. The composition of this example may also be applied for protection of aluminum surfaces.

EXAMPLE 18

This example shows that rare earth metal compounds will also function as the catalyst for the silane polymerization reaction. 15 parts methyltrimethoxysilane, 5 parts phenyltrimethoxysilane, 20 parts isopropyl alcohol, and 2 parts polydiethoxysiloxane (~50% solids), are mixed together with 0.4 parts cerium isopropoxide until the latter is dissolved. Then, 6 parts of water are added to complete catalysis. The resulting mixture is allowed to react for about 3 hours, after which it is applied, by spraying with dry $N_2$ propellant, to aluminum and to steel substrates, to a wet thickness of 1 mil. After curing, the resulting coating will be corrosion resistant and free of pinholes.

To the unused portion of the above coating composition, 0.2 parts of phenyltrimethoxysilane is added. The mixture will stabilize after about 1 hour, and thereafter the composition is applied to aluminum and steel substrates to a wet thickness of about 1 mil or less.

After ambient curing for 6 days, the coatings are similarly resistant to hydrochloric acid, as noted by immersion in the above described copper sulfate solution.

The composition of this example may be sold as a two or three part formulation, for example, the silanes and alcohol in one container, the catalyst in a second container, and the distilled or deionized water supplied separately or pre-mixed with either of the other two containers.

EXAMPLE 19

This example shows the use of a double metal alkoxide catalyst for the silane coating composition. A uniform solution, obtained by mixing 15 parts methyltrimethoxysilane, 5 parts phenyltrimethoxysilane, 20 parts isopropyl alcohol, and 2 parts polydiethoxysiloxane (~50% solids) is catalyzed with 6 parts of an alcoholic (isopropyl alcohol) solution of a double alkoxide of aluminum and titanium. The resulting mixture is allowed to react for about 4 hours using six parts water. The resulting coating composition may be applied to steel by spraying, using dry $N_2$ propellant, to a wet thickness of about 1 mil and then baked at 82° C. for 5 minutes. No pinholes will be observed when the resulting coated substrate is immersed in an acidic copper sulfate solution as described above.

To an unused portion of the above catalyzed composition, 0.2 parts of phenyltrimethoxysilane is added. After ambient curing for 6 days, the resistance will be equivalent to that of the composition without phenyltrimethoxysilane.

The stabilized phenyltrimethoxysilane coating composition may be applied as an overcoating on a potassium silicate coated concrete and will cure in about 3 days. After 5 days, the overcoated product may be immersed in water for at least 6 weeks without an observable change.

This composition may be applied, for example, to overcoat and contain rust aboard ocean going vessels.

EXAMPLE 20

To a mixture formed by combining 20 parts methyltrimethoxysilane, 20 parts isopropyl alcohol, and 2 parts polydiethoxysiloxane (~52% solids), there is added a catalyst containing 0.6 parts boron methoxide and 0.2 parts aluminum isopropoxide. After the solids are dissolve, water (6 parts) is added to complete the catalysis. The resulting mixture is allowed to stand (react) for about 1 hour. The reaction product may be applied to steel and aluminum coupons to wet thicknesses of 1 mil and 0.5 mil, respectively, and allowed to cure under ambient conditions for about 7 days. In this example, the titanate and boron ethoxide each function to hydrolyze ethyl silicate. These compositions have good stability and, consequently, a very long pot life.

This composition has been found to be effective, for example, as an overcoating for protecting and containing rust aboard ocean going vessels.

EXAMPLE 21

Following the same procedure as in Example 20, except that 0.4 parts by weight of iron ethoxide is used in place of the boron ethoxide and tetrabutoxytitanate, similar results will be obtained. The iron ethoxide adds an orange-red tint to the coating.

EXAMPLE 22

This example shows the formation of a coating composition which does not use a metal compound catalyst.

20 parts methyltrimethoxysilane, and 20 parts isopropyl alcohol, are mixed with 0.2 parts of aminoethylaminopropyltrimethoxysilane (as hydrolysis catalyst). After thoroughly mixing with 6 parts water, the mixture is allowed to react (hydrolyze) for 45 minutes. Then, the mixture is combined with 0.3 parts phenyltrimethoxysilane predispersed in 10 parts isopropyl alcohol. After about 1 hour, the composition is ready to be applied, by wiping, on stainless steel, or an acrylic coating on steel, on aluminum, etc. Further stabilization may be promoted by adding 0.2 to 0.3 parts of a silyl epoxide.

The coating composition of this example may also be used advantageously as a primer for a powder, e.g., epoxy, coating. In this case, after heating, the coating may be subjected to a cross-hatch (1 mm separation test). No adhesion loss is observed.

If in the above composition, the 0.2 parts of aminoethylaminopropyltrimethoxysilane is replaced with aminopropyltrimethoxysilane, similar results will be obtained.

EXAMPLE 23

15 parts methytrimethoxysilane, 5 parts phenyltrimethoxysilane, 6 parts (~50%) polydiethoxysiloxane (50%), and 20 parts isopropyl alcohol are combined with 0.4 parts aluminum isoproxide. After stirring until the catalyst is dissolved, 6 parts of water are added. After mixing the aqueous mixture for an additional fifteen minutes, the mixture is ready for use as a corrosion resistant coating composition. Corrosion resistant coatings are obtained on stainless steel, mild steel, aluminum, brass fixtures, bronze coupon, and galvanized iron by, for example, dipping or spraying with dry nitrogen propellant. In addition, the coating composition may be applied as an overcoating on a potassium silicate coated concrete (previously cured for 3 days). After curing for 7 days, the coating does not swell or change even after immersion in water for six weeks.

The coating formed in this example has a "glass-like" appearance and quality. It is presumed that the silica bonds (via oxygen) to and seals the metal substrate, whereas the phenyl groups from phenyltrimethoxysilane tend to rise to the surface forming a hard coating.

EXAMPLE 24

This example shows a three part mixed valence catalyst system for silane catalyzation. In particular, tetrabutoxy titanate (Ti+4) functions as the primary catalyst, boric acid (B+3) as secondary catalyst and calcium hydroxide (Ca+2) as tertiary catalyst. Together, these three catalysts are believed to enter the ethyl polysilicate into the final matrix and thereby create a nonporous silicone coating.

It has been found that this composition, even without addition of a stabilizer, has a pot life of about 2 days. These coating compositions provide excellent corrosion resistance, as seen from the results in the acid immersion test.

Twenty (20) parts methyltrimethoxysilane, 5 parts phenyltrimethoxysilane and 20 parts isopropyl alcohol are combined and thoroughly mixed. To this mixture is first added 0.2 parts of boric acid followed by addition of 4 parts of polydiethoxysiloxane (50%). After the boric acid is dissolved, 0.6 parts tetrabutoxy titanate and then 6.5 parts water are added. By adding the water slowly, premature hydrolysis of the tetrabutoxy titanate may be prevented. After about one hour, 1.6 parts of a 0.5% solution-suspension of calcium hydroxide in isopropyl alcohol is added and the mixture is allowed to react for at least one hour.

A steel coupon coated with this mixture (e.g., by spraying using dry $N_2$ propellant) and cured, e.g., by heating to 80° C. for 5 minutes, was found to be highly resistant to corrosion (no formation of visible pinholes) even after immersion in a 20% solution of copper sulfate in 5% HCl for 24 hours. In fact, this coating will provide corrosion resistance comparable or superior to commercially available epoxy coating compositions.

This composition may be used, for example, as a protective coating for aluminum, steel, stainless steel substrates, and especially, as an overcoating on rusted surfaces aboard ocean going vessels.

EXAMPLE 25

The following composition is prepared and may be used, for example, in coating steel.

Twenty parts of methyltrimethoxysilane are combined with 5 part of phenyltrimethoxysilane in a container to which is added 4 parts of a polydiethylsiloxane hydrolyzed to about 50% solids. To this mixture is added 0.3 parts boric acid. The mixture is stirred until the boric acid is dissolved. Next, 0.5 parts of tetrabutoxytitanate are added, while stirring is continued. Finally, 6.7 parts of water are slowly added to avoid a color change. After the catalyzed reaction proceeds for about two hours, the mixture may be applied to steel panels by spraying, using dry $N_2$. The coating will cure under ambient conditions in about one week. The resulting coating can withstand immersion in HCl bath for a minimum of two hours. It is believed that the boric acid, which is not corrosive to steel, forms a chemically inert borosilicate glass-like reaction product.

EXAMPLE 26

This example shows a formulation suitable for providing a salt, mildew and streak resistant coating for glass substrates, e.g., windows, especially in corrosive environment, such as in seaside dwellings.

To a container containing 600 parts of isopropyl alcohol there is added, while stirring, 24 parts of methyltrimethoxysilane and an equal amount of phenyltrimethoxysilane. To this mixture, there is added 6 parts of polydiethoxysiloxane (~50% solids) and one part of calcium hydroxide. Stirring is continued until the mixture remains cloudy, and then, 5.4 parts of water are added while stirring is continued.

The resulting coating may be applied to a glass window substrate by, for example, wiping. After evaporation of isopropyl alcohol, the surface can be polished, using a soft cloth or sponge, until it feels slick to the touch. An additional application may be necessary under severe conditions. The surface may require washing (e.g., with a dilute aqueous surfactant). If necessary, residual coating may be removed from the window, etc. by scraping (e.g., with a razor blade) followed by rinsing with alcohol (e.g., isopropyl alcohol).

Similar results are obtained when this composition is applied to metal (e.g., aluminum, steel, galvanized steel) substrates.

EXAMPLE 27

This example shows that formulations according to the present invention are strongly adherent to rusty metal substrates.

To a container containing 10 parts of polydiethoxysiloxane (~50%) is added 20 parts of isopropyl alcohol and 0.2 parts of aluminum isopropoxide, followed by 5 parts of phenyltrimethoxysilane. The mixture is stirred until it becomes clear. At that time, while continuing stirring, 2.3 parts of water are added, followed by 5 parts of phenyltrimethoxysilane. After stirring for about 3 hours, the mixture is applied over rusty steel windshield wiper holders (any loose, flaky rust is first manually removed). After more than six weeks of exposure, including several heavy rain storms, no rust is visible through the coating. The coating in this example contains approximately 56% silica, mostly as iron silicate.

EXAMPLE 28

To a container containing 10 parts of polydiethoxysiloxane (approx. 50%) is added, while stirring, 20 parts of isopropyl alcohol and 0.1 part of boric acid. Stirring is continued until the solution becomes clear. Then, 0.2 parts of titanium tetrabutoxy oxide are added. The mixture is stirred for about 3 hours. Then, 2.3 parts of water are added, while stirring, followed by 5 parts of phenyltrimethoxysilane. After stirring for an additional about 3 hours, the solution may be applied to metal, glass or ceramic substrates.

EXAMPLE 29

To a container containing 20 parts of isopropyl alcohol, there is added 15 parts of methyltrimethoxysilane, 5 parts of phenyltrimethoxysilane, 0.2 parts of boron methoxide, and 0.3 parts of aluminum isopropoxide. The mixture is stirred until the aluminum isopropoxide is dissolved.

Catalysis is completed by adding 6 parts water. Depending on the batch size, cooling may be required to control the reaction and reaction temperature.

EXAMPLE 30

This is an example of a primer coating composition according to this invention.

Into a container is placed 420 parts of isopropyl alcohol, 45 parts of aminoethylaminopropyltrimethoxysilane and 35 parts of 3-glycidoxypropyltrimethoxysilane. These ingredients are thoroughly mixed prior to adding 6 parts of water. The formulation is ready for use in about fifteen minutes and provides a solids loading, as silanol condensation products, of about 8% by weight.

The formulation may be applied to aluminum, galvanized steel, steel, etc. After becoming tacky, each of the substrates is top coated with, for example, a polyurethane resin or an epoxy resin. After ambient cure for about 24 hours, each over coated sample, and each primed substrate (without topcoat), is put into a salt spray environment operating between ambient temperature and 180° F. with 5 psi salt (20% solution) impinging on the coated topcoated or primed substrate. After at least 8 days, no creep or degradation on any of the samples is observed.

Similar results will be obtained when the proportions of the aminosilane and glycidyloxysilane are reversed.

Similar results will also be obtained using acrylic resins, polyester resins, and alkyd resins as the topcoat.

EXAMPLE 31

This example is similar to Example 26 except that instead of 24 parts of methyltrimethoxysilane, 48 parts of isobutyltrimethoxysilane was mixed with 24 parts of phenyltrimethoxysilane while stirring.

Similar results will be obtained when the procedure of Example 26 is followed. Further improvements in flow and clarity are obtained by adding 8 parts glycidyloxypropyltrimethoxysilane with the other organosilane compounds.

Similar results will also be obtained when any of the compositions of this Example or Example 26 are applied to metal substrates.

EXAMPLE 32

This example demonstrates the feasibility of amine catalyzation without acid stabilization, cf. Example 1.

Twenty parts of isopropyl alcohol are added to a pot followed by 15 parts of methyltrimethoxysilane and 5 parts of propyltrimethoxysilane. While stirring, 0.9 part of bis (trimethoxysilylpropyl)amine is added. Then, 6 parts of water are added. After reacting for about 4 hours the mixture may be applied by dipping or spraying onto aluminum or other metal substrate. The dipped and sprayed coatings become hard in about three hours. The mixture will not set up.

EXAMPLE 33

This example demonstrates the feasibility of fusing a fugitively functioning (i.e., gas generating, e.g., $H_2S$) catalyst to generate a coating from the invention silane coating composition.

20 parts of isopropyl alcohol are added to a pot, followed by 15 parts of methyltrimethoxysilane and 5 parts of propyltrimethoxysilane. While stirring, 0.9 part of mercaptopropyltrimethoxysilane is added followed by 6 parts water. After reacting for about 4 hours the mixture may be applied by dipping or spraying onto aluminum. The coating becomes hard in about 4 hours after application.

In this example, an intermediate silyl moiety, capable of promoting hydrolysis and slow polymerization, is created. As another example of fugitively functioning catalyst, a disilylsilazane, such as hexamethyldisilazane (an ammonia generator), heptamethyl disilazane, and the like, may be mentioned.

EXAMPLE 34

This example shows a three part formulation (3-container formulation) which provides extremely stable coatings.

200 parts methyltrimethoxysilane and 100 parts isopropyl alcohol are mixed in a first container (Container A). Separately, in Container B, 40 parts of a saturated solution of calcium hydroxide is diluted with 20 parts of water before the diluted solution is added to Container A.

In Container C, 6.2 parts boric acid is dissolved in 96.8 parts of isopropyl alcohol and is after cooling begins, is combined with the contents of Container A (to which the contents of Container B has been added).

After about three days, the resulting mixture forms a sprayable or wipeable coating composition which may be applied to virtually any metal to provide an extremely corrosion-resistant, heat-resistant finish. This coating composition may be used, for example, on inside surfaces of food and beverage containers; on exterior and interior building materials, such as ceramic roofing tiles, concrete, galvanized steel, interior duct works, and the like, to protect against deposition and growth of mildew or other infectious organisms; overcoating of coated or uncoated concrete and metallic surfaces to protect against and facilitate removal of graffiti; overcoating to protect automotive, truck (inclusive of cement and other construction trucks), buses and other vehicle finishes; high temperature applications, such as, for example, manifolds, exhaust systems, cooking utensils, ovens, and the like; corrosion protection and/or deicing agent (in combination with a primer, e.g., Example 30, of this invention); and gel-coat maintenance finish.

EXAMPLE 35

20 parts each of methyltrimethoxysilane and isopropyl alcohol are mixed in a first container, Container A. Then, 0.3 part of boric acid is added, followed by addition of 0.2 to 0.3 part of tetrabutyl titanate to assist in the solubilization of the boric acid catalyst. Finally, 10 to 20 parts of water are added slowly, since the reaction is exothermic. After a few minutes, the mixture will warm up and may be applied to a metallic or non-metallic substrates. The mode of application is not particularly limited and spraying, wiping, brushing, and the like may be mentioned as suitable techniques.

EXAMPLE 36

As a further indication of the excellent corrosion resistance and adhesion of the primers of the present invention, one-half inch thick steel panels, which are first degreased and sand blasted, are primed with the primer composition prepared according to the above Example 30. To the cured dried primer coating, a topcoat of Navy Standard epoxy deck coating is applied and allowed to cure.

Each of the so prepared panels is subjected to an ASTM pull test. Whereas primers currently in use fail this test at only 300–320 psi, the primer of this invention is able to withstand more than 600 psi, without failing, and generally, about to about 700–720 psi, before failing.

EXAMPLE 37

In this example, the primer of Example 30, is used to prime a steel panel for an automobile. A standard automobile finish is applied to aluminum panels primed with the composition of the present invention. The primed panels are able to withstand at least 30 or more flexures of about 120° before the applied finish (paint) flexes free at the bend. However, when the so treated flexed panel is subjected to salt spray for three weeks no corrosion is observed on the underlying aluminum panels, indicated that the primer remains in contact with the panel without separation.

EXAMPLE 38

This example illustrates the application of the coating composition of the present invention to vinyl and asphalt tiles. For this application, a vinyl group containing silane will be used in the invention coating compositions.

To the composition of Example 4, 0.7%, based on the weight of the silanes, of 3-methacryloxypropyltrimethoxysilane is added. The resulting coating may be applied to the exposed tile surface by brushing, or spraying, to a thickness of not more than about 1 mil. The resulting coating provides a mildew resistant tile.

Similar results will be obtained by using the vinyl silane compound in an amount of from about 0.5 to 1%, based on the weight of the silanes. Similar results will also be obtained by using as the vinyl silane, 3-acryloxypropyltrimethyloxysilane, vinyltriethoxysilane or vinyltrimethoxysilane. Similar results are also be obtained by adding the vinyl silane to the composition of Examples 5–8.

EXAMPLE 39

To render a surface resistant to marring by graffiti, the resulting coating should be resistant to ultraviolet (UV) light exposure (e.g., sunlight), and be able to withstand repeated washings, often as frequently as daily washings. This latter property may be achieved by a high gloss coating to provide the surface stable to repeated solvent application.

Generally, therefore, to facilitate on site application to an existing wall surface, for example, the coating composition should be applied after preliminary reaction to increase the viscosity and provide a non-sacrificial coating. Therefore, the preferred coating compositions according to this invention, for providing an "anti-graffiti" coating, will be able to provide an exothermic reaction capable of raising the temperature by at least about 70° C. in a gallon sized container. One suitable composition for this purpose, therefore, comprises an acid or titanium alcoholate-boric acid containing composition with a mixture of phenyltrimethoxysilane and methyltrimethoxysilane, such as the composition according to Example 2, which, when hydrolyzed-polymerized, with shaking, provides the desired temperature increase. Since the compositions are generally applied while still warm, it is preferred to use an inert gas (e.g., nitrogen) propellant to slow solvent evaporation. Coatings according to the present invention are able to withstand upwards of 100 or more solvent cleaning procedures without degradation.

EXAMPLE 40

This example illustrates the application of the compositions according to the present invention which are required to withstand exposure to high temperature, such as, for example, manifolds, ovens, and the like. As was the case for the application to "anti-graffiti" coatings in Example 39, the compositions for high temperature applications should preferably also undergo a substantial temperature increase, usually at least about 70° C. or more (for a gallon size batch). Alternatively, compositions which cure under ambient conditions over a period of about one week or longer, may be used.

In this regard, as the content of the silane oligomers in the composition decrease, the temperature stability will correspondingly increase.

A primer composition as described in Example 30 is prepared and, after the temperature thereof has increased by about 70° C. over ambient, is applied to an aluminum substrate. An overcoat of an acid free coating material is then applied. The aluminum may be subjected to high temperature above the melting point of aluminum to generate a red heat until the overcoat becomes fully tack free.

What is claimed is:

1. An aqueous coating composition formed by admixing
   (A) at least one silane of the formula (1)

$$R^1Si(OR^2)_3 \qquad (1)$$

wherein
   $R^1$ is a $C_1$–$C_6$ alkyl group, a phenyl group or a functional group containing at least one of vinyl, acrylic, amino, mercapto, or vinyl chloride functional group; and
   $R^2$ is a $C_1$–$C_6$ alkyl group;
   (C) acid component comprising a member selected from the group consisting of water-soluble organic acids, $H_3BO_3$ and $H_3PO_3$; and
   (D) water and further comprising a silane compound of formula (4):

$$X[R^1Si(OR^2)_3]_2 \qquad (4)$$

where $R^1$ and $R^2$ are as defined above, and X represents an amino group or keto group

2. The aqueous coating composition according to claim 1, comprising (B) at least one alkali component comprising an hydroxide or carbonate of magnesium, calcium, or zinc.

3. The aqueous coating composition according to claim 2, further comprising (E) epoxy silane.

4. The aqueous coating composition according to claim 1, further comprising (E) epoxy silane.

5. An aqueous coating composition according to claim 1, further comprising (H) $C_2$–$C_4$ alkanol.

6. The coating composition according to claim 1, wherein in formula (1) $R^2$ is methyl.

7. The coating composition according to claim 1, wherein $R^1$ is $C_1$–$C_6$ alkyl.

8. The coating composition according to claim 1, wherein said at least one silane of formula (1) comprises methyltrimethoxysilane.

9. The coating composition according to claim 1, wherein said at least one silane comprises a mixture comprising methyltrimethoxysilane and phenyltrimethoxysilane.

10. The coating composition according to claim 1, wherein said acid component (C) comprises acetic acid.

11. The coating composition according to claim 1, wherein said acid component comprises $H_3BO_3$.

12. The coating composition according to claim 1, wherein said acid component comprises $H_3PO_3$.

13. The coating composition according to claim 1, further comprising (F) silicate component selected from the group consisting of ethyl orthosilicate and ethyl polysilicate.

14. The coating composition according to claim 13, wherein said silicate component (F) has been hydrolyzed to about 28% to about 52% silica.

15. The coating composition according to claim 1, further comprising (G) mono- $C_1$–$C_6$ alkyl ether of ethylene glycol.

16. The composition according to claim 1, further comprising a catalytic amount of calcium hydroxide or tetramethylammonium hydroxide, and wherein component (A) comprises a mixture of at least two silane compounds of formula (1), wherein $R^1$ in one silane compound is a $C_1$–$C_6$ alkyl group and $R^1$ in another silane compound is an aryl group.

17. The composition according to claim 16, wherein component (A) comprises a mixture of methyltrimethoxysilane and phenyltrimethoxysilane; and component (C) comprises partially hydrolyzed tetraethylsilicate.

18. The composition according to claim 17, further comprising (G) $C_2$–$C_4$ alcohol solvent.

19. An aqueous coating composition formed by admixing (A) at least one silane of the formula (1)

$$R^1Si(OR^2)_3$$

wherein
$R^1$ is a $C_1$–$C_6$ alkyl group, a phenyl group or a functional group containing at least one of vinyl, acrylic, amino, mercapto, or vinyl chloride functional group; and
$R^2$ is a $C_1$–$C_6$ alkyl group;

(C) acid component comprising a member selected from the group consisting of water-soluble organic acids, $H_3BO_3$ and $H_3PO_3$; and (D) water; and further comprising (J) (i) colloidal aluminum hydroxide, (ii) metal alcoholate of formula (2)

$$M(OR^3)_m \qquad (2)$$

wherein M is titanium, $R^3$ is a $C_1$–$C_8$ alkyl group, m is an integer of 3 or 4, or (iii) mixture of (i) and (ii).

20. The coating composition according to claim 19, wherein $R^3$ is an isopropyl group or an n-butyl group.

21. An aqueous coating composition formed by admixing (A) at least one silane of the formula (1)

$$R^1Si(OR^2)_3 \qquad (1)$$

wherein
$R^1$ is a $C_1$–$C_6$ alkyl group, a phenyl group or a functional group including at least one of vinyl, acrylic, amino, mercapto, or vinyl chloride functional group; and
$R^2$ is a $C_1$–$C_6$ alkyl group;

(B) base component;

(D) water; and (K) a gellation inhibiting amount of silane hydrolysis catalyst comprising chromium acetate hydroxide.

22. An aqueous coating composition according to claim 21, wherein the base component (B) comprises aminosilane.

23. An aqueous coating composition according to claim 22, further comprising (E) epoxy silane.

24. An aqueous coating composition according to claim 22, wherein the aminosilane comprises 3-(2-aminoethylamino)propyl-trimethoxysilane or 3-aminopropyltrimethoxysilane.

25. The coating composition according to claim 24, wherein the silane hydrolysis catalyst comprises acetic acid.

26. An aqueous coating composition formed by admixing (A) at least one silane of the formula (1)

$$R^1Si(OR^2)_3 \qquad (1)$$

wherein
$R^1$ is a $C_1$–$C_6$ alkyl group, a phenyl group or a bifunctional silane containing vinyl, acrylic, amino, or vinyl chloride functional group; and
$R^2$ is a $C_1$–$C_6$ alkyl group;

(D) water;

(H) $C_2$–$C_4$ alkanol; and (K) chromium acetate hydroxide.

* * * * *